Figure 1:
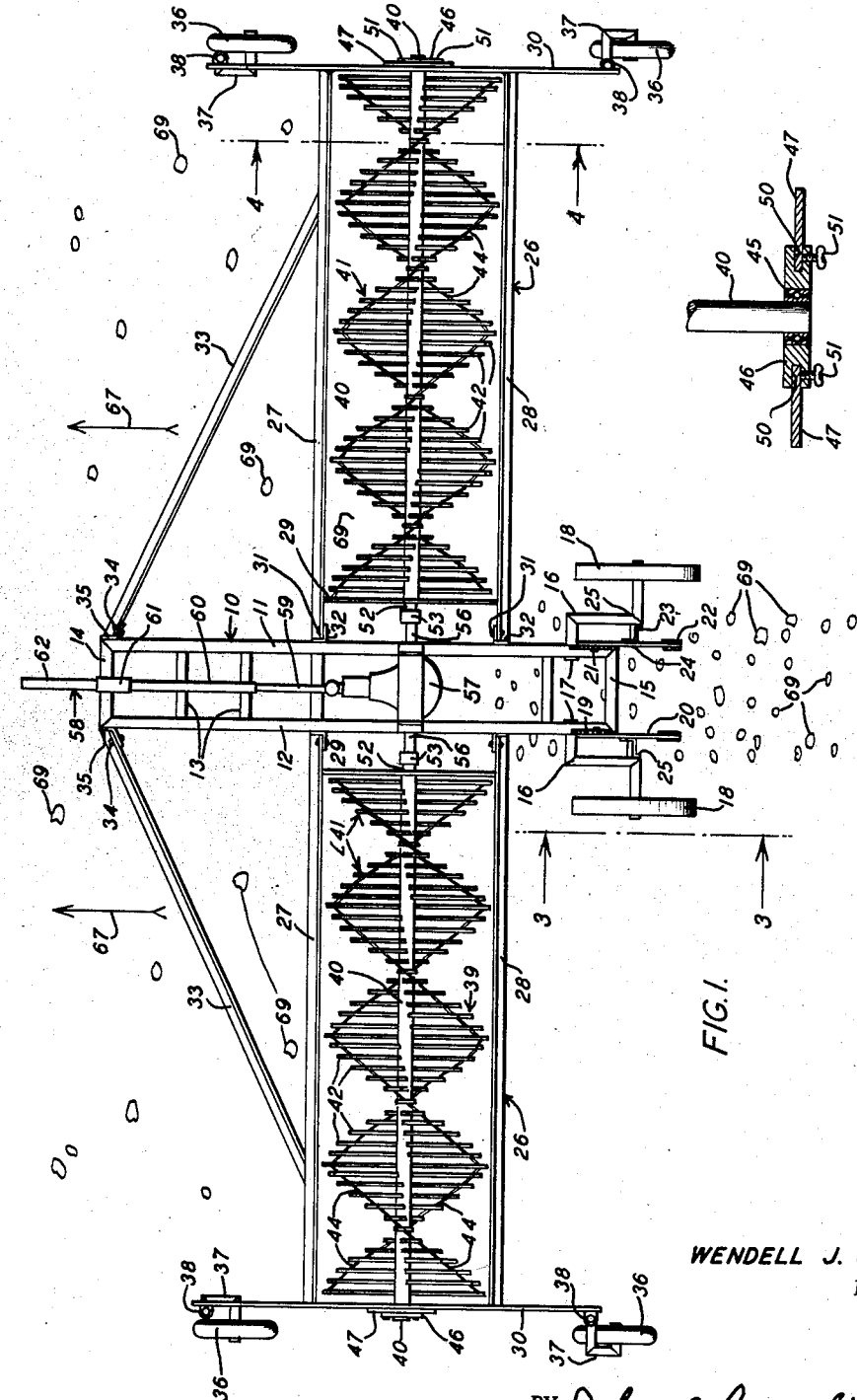

Sept. 29, 1959

W. J. JOHNSON 2,906,351

ROCK WINDROWER

Filed Oct. 12, 1956

2 Sheets-Sheet 1

WENDELL J. JOHNSON
INVENTOR

BY John A. Mawhinney

ATTORNEY

Sept. 29, 1959     W. J. JOHNSON     2,906,351
ROCK WINDROWER
Filed Oct. 12, 1956     2 Sheets-Sheet 2
FIG. 2.
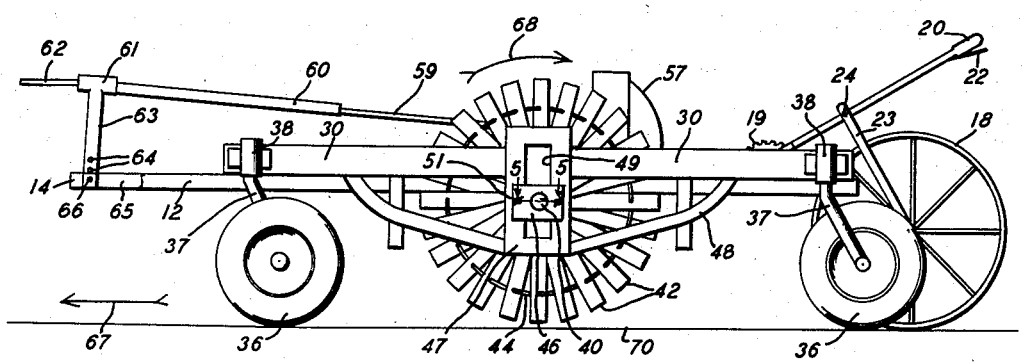
FIG. 4.
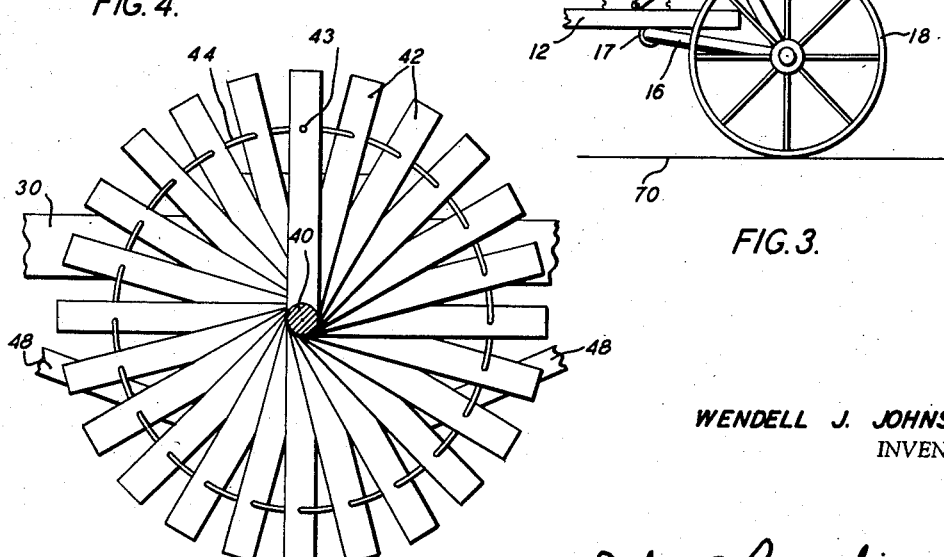
FIG. 3.
WENDELL J. JOHNSON
INVENTOR
BY John A. Mawhinney
ATTORNEY United States Patent Office 2,906,351
Patented Sept. 29, 1959

2,906,351
ROCK WINDROWER
Wendell J. Johnson, Corinth, N. Dak.
Application October 12, 1956, Serial No. 615,685
7 Claims. (Cl. 171—63)

The present invention relates to a rock windrower and has for an object the provision of a device of this kind which will dislodge any rocks, stones or the like lying on the surface of the ground or embedded slightly therein and will deposit them in a windrow as the device moves over a field so that they can be easily removed from the field.

Another object of the present invention is to provide a device of this character in which the dislodging implements are arranged in auger-like formation so that the rocks and the like are progressively moved from the lateral end portions of the device towards the center and there piled in a windrow as the device travels over the ground.

A further object of the present invention is the provision of a rock windrower in which the implements are mounted for automatic swinging movement in a vertical plane to permit the implements to follow the contour of the terrain over which the device is being moved.

A still further object of the present invention is to provide an implement of this type in which the implements are mounted for adjustment in a vertical plane so as to control the extent to which the implements will penetrate the ground.

The present invention aims to provide a rock windrower which is provided with a driven shaft adapted to be connected to the conventional power take-off shaft of a conventional tractor and in which the length and elevation of the driven shaft can be adjusted.

The present invention also aims to provide a device of this type in which means are provided to rotate the implements in a direction opposite to the direction of movement of the device over the ground during the windrowing operation.

In one of its broadest aspects the present invention contemplates the provision of a rock windrower comprising supporting means adapted to be moved over ground having rocks therein and auger means on the supporting means for engaging the rocks and gathering them into a windrow.

More specifically, the present invention contemplates the provision of a rock windrower adapted to be moved over ground having rocks therein comprising a main frame, a pair of side frames, auger means carried by each side frame and each means comprising a rotatable shaft and a plurality of implement teeth fast on said shaft for penetrating the ground for engaging and dislodging the rocks and depositing them in a windrow and hinge means between each side frame and the main frame for selectively permitting the implement teeth to follow the contour of the ground or to be swung clear of the ground.

With the foregoing and other objects in view, the invention will be hereinafter more fully described and more particularly pointed out in the appended claims.

In the drawings in which the same parts are denoted by the same reference numerals throughout the several views, Figure 1 is a top plan view of a rock windrower constructed in accordance with the present invention,
Figure 2 is an end elevational view of the same,
Figure 3 is a view taken on the line 3—3 of Figure 1,
Figure 4 is a sectional view taken on the line 4—4 of Figure 1, and
Figure 5 is a sectional view on the line 5—5 of Figure 2.

Referring more particularly to the drawings, 10 generally indicates a main frame comprising a pair of spaced apart parallel channel members or bars 11 and 12, intermediate cross beams 13 and end braces 14 and 15. The channel members 11 and 12 have their open portions facing inwardly towards one another and the braces are secured to the channel members as by welding or the like.

A crank axle 16 is pivotally mounted as at 17 on each of the members 11 and 12 adjacent the rear end brace 15 and a ground engaging wheel 18 is mounted upon each axle 16.

A segmental ratchet plate 19 is secured as by welding or the like to each member 11 and 12 and a lever 20 is pivotally mounted as at 21 to the ratchet plate. At 22 is indicated a conventional pawl and operating handle which is carried by the lever 20 and cooperates with the ratchet 19 to hold the lever 20 in its selected position. A link 23 has one end pivotally connected as at 24 to the lever and its opposite end pivotally connected as at 25 to the axle 16.

A pair of side frames extend from the opposite sides of the main frame 10 and each side frame is indicated generally at 26 and comprises a forward member or bar 27 and a rear member or bar 28 held in parallel spaced apart relation by an inner end piece 29 and an outer end piece 30. The bars 27 and 28 may be of angle iron formation in cross section. The bars 27 and 28 are hingedly connected to the main frame bars 11 and 12 by pivot pins 31 which extend through the vertical flange of each bar 27 and 28 and through one flange of an angle iron bracket 32. The other flange of the bracket 32 is secured to its bar 11 or 12 as by welding. A diagonal brace 33 has one end attached to the forward bar 27 of each side frame and its opposite end pivotally connected as at 34 to one flange of a bracket 35. The other flange of the bracket 35 is secured as by welding to its main frame bar 11 or 12 adjacent the forward end brace 14.

Each outer end piece 30 has a pair of ground engaging caster wheels 36 mounted thereon. Each wheel is mounted on an axle 37 which has a portion rotatably supported in a bearing 38 carried by the end piece 30.

An implement generally indicated at 39 is carried by each side frame 26 and comprises a rotatable shaft 40 and a series of auger-like segments 41, each comprising a plurality of implement blades or teeth 42 secured to the shaft 40. The blades 42 of each segment have their inner ends secured to the shaft 40 by welding or the like at axially spaced points on the shaft and the adjacent blades are secured to the shaft at angularly spaced apart points on the shaft. The corresponding blades of the segments are in axial alignment with one another. Adjacent its outer end each blade has an aperture 43 through which a tie rod 44 is threaded. The tie rod extends from one segment 41 to the next segment.

The outer end of each rotatable shaft 40 is mounted in bearings 45 carried by a bearing block 46 adjustably mounted in a bracket 47 which is secured as by welding or the like to the outer end piece 30 and to the intermediate portion of a bow shaped brace 48. The opposite ends of the brace 48 are secured as by welding or the like to the end piece 30. The bracket 47 is a substantially rectangular flat plate having a centrally disposed vertically elongated opening 49 therethrough in which the bearing block 46 is slidably disposed. The opposite vertical side edge portions of the block 46 are bifurcated to provide grooves 50 for slidably receiving the adjacent edge portions of the bracket opening 49. Set screws 51 extend through suitable apertures in the outer part of the bifurcated portions of the block 46 to engage and bind the bracket 47 to hold the block 46 and the shaft 40 in their adjusted vertical position.

The inner end of each shaft 40 is of reduced diameter as indicated at 52 and extends through a suitable bearing mounted in the inner end piece 29. A flexible coupling 53 connects the shaft 40 to a shaft 56 which forms a part of a conventional automobile differential 57 secured to the main frame members 11 and 12. The differential is connected to a driven shaft generally indicated at 58 which comprises a non-circular or square section 59 having one end connected to the differential and its opposite end portion telescopically received by an intermediate section 60 having a complementary shaped bore. The section 60 is coupled by a universal joint 61 to an outer shaft section 62 adapted to be coupled to the power take-off shaft of a conventional type tractor to be driven thereby.

The shaft 58 is supported by an adjustable support or standard 63 which has its upper end secured to the under face of the housing of the universal joint 61 and its lower end portion has a vertical row of openings 64 adapted to be brought selectively into alignment with an opening formed in a longitudinal flat brace 65.

A keeper 66, which may be a bolt or pin, extends through the aligned openings in the standard and brace to retain the standard in its vertically adjusted position. The brace 65 has its forward end secured to the forward end brace 14 and its rear end secured to the adjacent intermediate cross brace 13 as by welding or the like.

In the use of the device, the depth of desired penetration of the implements 42 will be obtained by moving the levers 20 in the desired direction to raise or lower the main frame and the portions of the side frames adjacent to the main frame. The bearing blocks 46 will then be adjusted to adjust the shafts and implements 42 in accordance with the adjustment of the frames. The shaft section 62 will be coupled to a tractor power take-off shaft. The shaft 58, if necessary, will be adjusted by its support 63 so as to align properly the shaft section 62 with the tractor power take-off shaft. If necessary for draft purposes, a conventional coupling may be provided between the tractor and the implement.

The device will travel in the direction indicated by arrows 67, as indicated in Figures 1 and 2, and the implement teeth 42 will be driven in the opposite direction, as indicated by arrow 68 in Figure 2. As the device moves over the ground of the field from which it is desired to remove the rocks, the teeth 42 will penetrate the soil to dislodge and move to the surface of the ground any rocks, stones or the like, which the teeth encounter and, together with any rocks or the like already lying on the ground, will be moved by the auger-like segments 41 towards the longitudinal center of the device. The rocks or the like will be deposited in a windrow, as indicated at 69, in the wake of the device as it moves over the field.

When it is desired to transport the device from one field to another, the levers 20 will be swung to the position shown in Figure 2 and the bearing blocks 46 will be adjusted upwardly until the teeth 42 are clear of the ground 70, as illustrated in Figure 2. In order to pass through gates or other narrow places, the side frames 26 may be swung upwardly on their pivots 31 and 34 and the attachment between the outer ends of the diagonal braces 33 and the side frames 26 may be a conventional slot and pin or bolt arrangement.

It is obvious that various changes and modifications may be made in the details of construction and design of the above specifically described embodiment of this invention without departing from the spirit thereof, such changes and modifications being restricted only by the scope of the following claims.

What I claim is:

1. A rock windrower comprising supporting means adapted to be moved over ground having rocks therein and auger means on said supporting means for engaging the rocks and gathering them into a windrow, said auger means comprising at least one rotatable shaft, a plurality of teeth each having one end portion secured to said shaft at axially spaced apart points on the shaft with adjacent teeth angularly spaced apart, and tie means interconnecting said teeth adjacent the other end portion of each tooth and extending across the space between adjacent teeth.

2. A rock windrower comprising supporting means adapted to be moved over ground having rocks therein and auger means on said supporting means for engaging the rocks and gathering them into a windrow, said auger means comprising at least one rotatable shaft, and a plurality of units of teeth secured to said shaft and providing a segment of an auger, the teeth of each unit being secured to said shaft at axially spaced apart points on the shaft with adjacent teeth angularly spaced apart, the teeth of each unit being in axial alignment with the corresponding teeth of the other units.

3. A rock windrower comprising a mobile frame having a center line and adapted to be moved over ground having rocks therein, at least two auger means on said frame each comprising a rotatable shaft and a plurality of implement teeth secured to said shaft in auger-like formation for penetrating the ground for engaging and dislodging the rocks and depositing them in a windrow, and means for rotating said augers in a direction opposite to the direction of travel of the frame for gathering the rocks in a windrow along the center line of the frame.

4. A rock windrower adapted to be moved over ground having rocks therein comprising a main frame having a longitudinal center line, a pair of side frames on each side of and spaced from said center line, auger means carried by each side frame and each comprising a rotatable shaft and a plurality of implement teeth fast on said shaft and spaced a substantial distance from said center line for penetrating the ground for engaging and dislodging the rocks and depositing them in a windrow along the center line of the machine, hinge means between each side frame and the main frame for selectively permitting the implement teeth to follow the contour of the ground or to be swung clear of the ground, means cooperating with the hinge means for adjusting the extent to which the implement teeth of each auger means adjacent the main frame penetrate the ground, and independent means for adjusting the extent to which the implement teeth of each auger means adjacent the outer end of the side frames penetrate the ground.

5. A rock windrower adapted to be moved over ground having rocks therein comprising a main frame, a pair of side frames, auger means carried by each side frame and each comprising a rotatable shaft and a plurality of implement teeth fast on said shaft for penetrating the ground for engaging and dislodging the rocks and depositing them in a windrow, a drive shaft connected to each of said auger shafts to drive them in a direction opposite to that of the movement of the implement over the ground, and means for adjusting the elevation and length of said drive shaft.

6. A rock windrower adapted to be moved over ground having rocks therein comprising a main frame having a longitudinal center line, a pair of side frames carried by said main frame, each side frame extending outwardly from the main frame on each side of said center line at substantially right angles thereto and spaced from said center line, auger means carried by each side frame and each comprising a rotatable shaft and a plurality of implement teeth fast on said shaft and spaced a substantial distance from said center line to provide an area on each side of the center line for penetrating the ground for engaging and dislodging the rocks and depositing them in a windrow in said center line area.

7. A rock windrower adapted to be moved over ground having rocks therein comprising a main frame having a center line, a pair of side frames carried by said main frame, each side frame extending outwardly from the main frame on each side of said center line and spaced from said center line, auger means carried by each side frame and each comprising a rotatable shaft and a plurality of implement teeth on said shaft and spaced a substantial distance from said center line to provide an area on each side of the center line for penetrating the ground for engaging and dislodging the rocks and depositing them in a windrow in said center line area.

References Cited in the file of this patent

UNITED STATES PATENTS

| | | |
|---|---|---|
| 2,256,593 | Hill | Sept. 23, 1941 |
| 2,480,419 | Patterson | Aug. 30, 1949 |
| 2,650,460 | Newhouse | Sept. 1, 1953 |